US012604015B2

(12) United States Patent
Wang

(10) Patent No.: US 12,604,015 B2
(45) Date of Patent: Apr. 14, 2026

(54) METHOD, APPARATUS, AND MEDIUM FOR VIDEO PROCESSING

(71) Applicant: Bytedance Inc., Los Angeles, CA (US)

(72) Inventor: Ye-Kui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/623,726

(22) Filed: Apr. 1, 2024

(65) Prior Publication Data

US 2024/0244234 A1 Jul. 18, 2024

Related U.S. Application Data

(63) Continuation of application No. PCT/US2022/077400, filed on Sep. 30, 2022.
(Continued)

(51) Int. Cl.
*H04N 19/184* (2014.01)
*H04N 19/172* (2014.01)

(52) U.S. Cl.
CPC ......... *H04N 19/184* (2014.11); *H04N 19/172* (2014.11)

(58) Field of Classification Search
CPC .... H04N 19/184; H04N 19/70; H04N 19/172; H04N 21/6547; H04N 21/85406; H04N 19/44; H04N 19/197; H04N 7/014; H04N 21/26258; H04N 19/188; H04N 19/423; H04N 21/816; H04N 21/8456; H04N 19/119; H04N 19/157; H04N 19/176; H04N 19/96; H04N 21/2362; H04N 21/4345; H04N 21/44004; H04N 21/8451; H04N 19/117; H04N 19/124; H04N 19/186; H04N 19/42; H04N 19/91; H04N 21/234;
(Continued)

(56) References Cited

U.S. PATENT DOCUMENTS

2014/0080412 A1* 3/2014 Kang ...................... H04B 5/00
455/41.1
2019/0379876 A1 12/2019 Hur et al.
(Continued)

FOREIGN PATENT DOCUMENTS

CN 111630858 A 9/2020
WO 2020076058 A1 4/2020

OTHER PUBLICATIONS

ISO/IEC 14496-15:2019/DAmd 2(en) Information technology—Coding of audio-visual objects—Part 15: Carriage of network abstraction layer (NAL) unit structured video in the ISO base media file format—Amendment 2: Carriage of WVC and EVC in ISOBMFF (Year: 2020).*
(Continued)

*Primary Examiner* — Fabio S Lima
(74) *Attorney, Agent, or Firm* — Astute IP Law Group

(57) ABSTRACT
Embodiments of the present disclosure provide a solution for video processing. A method for video processing comprises: performing a conversion between a media file of a video and a bitstream of the video, wherein the media file comprises a data structure indicating video decoder initialization information (VDII) for decoding the bitstream, the data structure being at a level higher than a track level. Compared with the conventional solution, the VDII can be signaled more efficiently.

20 Claims, 5 Drawing Sheets

100

Related U.S. Application Data

(60) Provisional application No. 63/251,355, filed on Oct. 1, 2021.

(58) Field of Classification Search
CPC ................ H04N 21/44; H04N 21/4788; H04L 2012/5603; H04L 65/00; H04L 65/1045; H04L 65/1069; H04L 65/1101; H04L 67/563; H04L 67/568; H04L 69/14; H04L 69/329; H04L 9/40; H04L 12/18; H04L 12/1877
See application file for complete search history.

(56) References Cited

U.S. PATENT DOCUMENTS

| | | | |
|---|---|---|---|
| 2022/0167042 A1* | 5/2022 | Hannuksela ..... | H04N 21/26258 |
| 2022/0232256 A1* | 7/2022 | Wang .................... | H04N 19/70 |

OTHER PUBLICATIONS

International Search Report in PCT/US2022/077400, mailed Jan. 26, 2023, 3 pages.

* cited by examiner

400

402

PERFORM A CONVERSION BETWEEN A MEDIA FILE OF A VIDEO
AND A BITSTREAM OF THE VIDEO

500

METHOD, APPARATUS, AND MEDIUM FOR VIDEO PROCESSING

CROSS REFERENCE TO RELATED APPLICATIONS

This application is a continuation of International Application No. PCT/US2022/077400, filed on Sep. 30, 2022, which claims the benefit of the U.S. Provisional Application No. 63/251,355, filed Oct. 1, 2021. The entire contents of these applications are hereby incorporated by reference in their entireties.

FIELD

Embodiments of the present disclosure relates generally to video coding techniques, and more particularly, to signaling of video decoder initialization information (VDII) using entity grouping.

BACKGROUND

Media streaming applications are typically based on the internet protocol (IP), transmission control protocol (TCP), and hypertext transfer protocol (HTTP) transport methods, and typically rely on a file format such as the ISO base media file format (ISOBMFF). One such streaming system is dynamic adaptive streaming over HTTP (DASH). In DASH, there may be multiple representations for video and/or audio data of multimedia content, different representations may correspond to different coding characteristics (e.g., different profiles or levels of a video coding standard, different bitrates, different spatial resolutions, etc.). Moreover, signaling of video decoding initialization information (DII) in the ISOBMFF has been proposed. Therefore, it is worth studying on a mechanism for signaling the information more efficiently.

SUMMARY

Embodiments of the present disclosure provide a solution for video processing.

In a first aspect, a method for video processing is proposed. The method comprises: performing a conversion between a media file of a video and a bitstream of the video, wherein the media file comprises a data structure indicating video decoder initialization information (VDII) for decoding the bitstream, the data structure being at a level higher than a track level.

Based on the method in accordance with the first aspect of the present disclosure, the VDII is indicated by a data structure at a level higher than a track level. Compared with the conventional solution where the VDII is signaled based on a track group at the track level, the proposed method can advantageously make it possible to figure out all the tracks that share the same VDII without parsing all the video tracks in the media file. Thereby, the VDII can be signaled more efficiently.

In a second aspect, an apparatus for processing video data is proposed. The apparatus for processing video data comprising a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus. The method comprises: performing a conversion between a media file of the video and the bitstream. The media file comprises a data structure indicating video decoder initialization information (VDII) for decoding the bitstream, the data structure being at a level higher than a track level.

In a fifth aspect, a method for storing a bitstream of a video is proposed. The method comprises: performing a conversion between a media file of the video and the bitstream; and storing the bitstream in a non-transitory computer-readable recording medium. The media file comprises a data structure indicating video decoder initialization information (VDII) for decoding the bitstream, the data structure being at a level higher than a track level.

In a sixth aspect, another non-transitory computer-readable recording medium is proposed. The non-transitory computer-readable recording medium stores a media file of a video which is generated by a method performed by a video processing apparatus. The method comprises: performing a conversion between the media file and a bitstream of the video. The media file comprises a data structure indicating video decoder initialization information (VDII) for decoding the bitstream, the data structure being at a level higher than a track level.

In a seventh aspect, a method for storing a media file of a video is proposed. The method comprises: performing a conversion between the media file and a bitstream of the video; and storing the media file in a non-transitory computer-readable recording medium. The media file comprises a data structure indicating video decoder initialization information (VDII) for decoding the bitstream, the data structure being at a level higher than a track level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
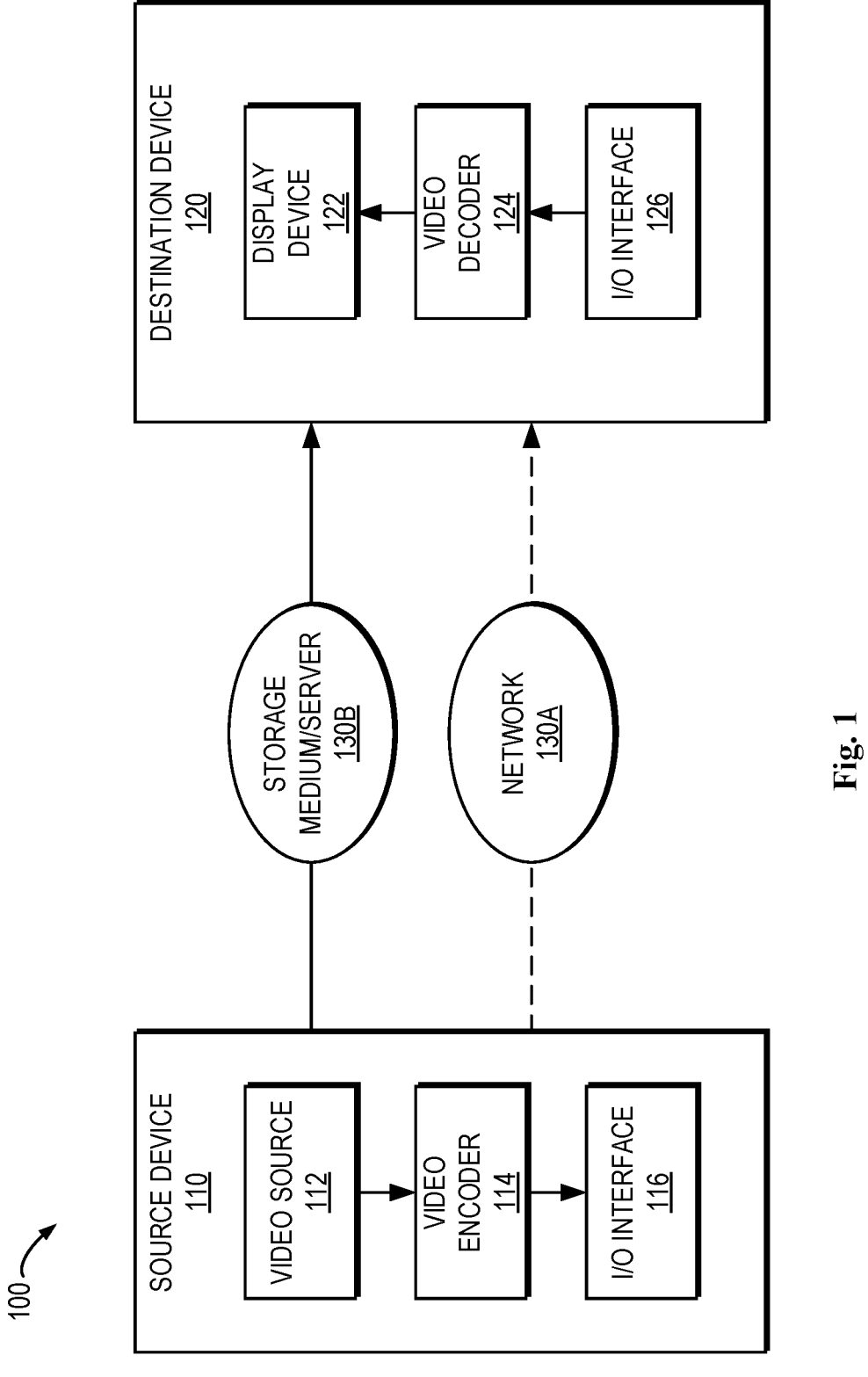
FIG. 1 illustrates a block diagram that illustrates an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
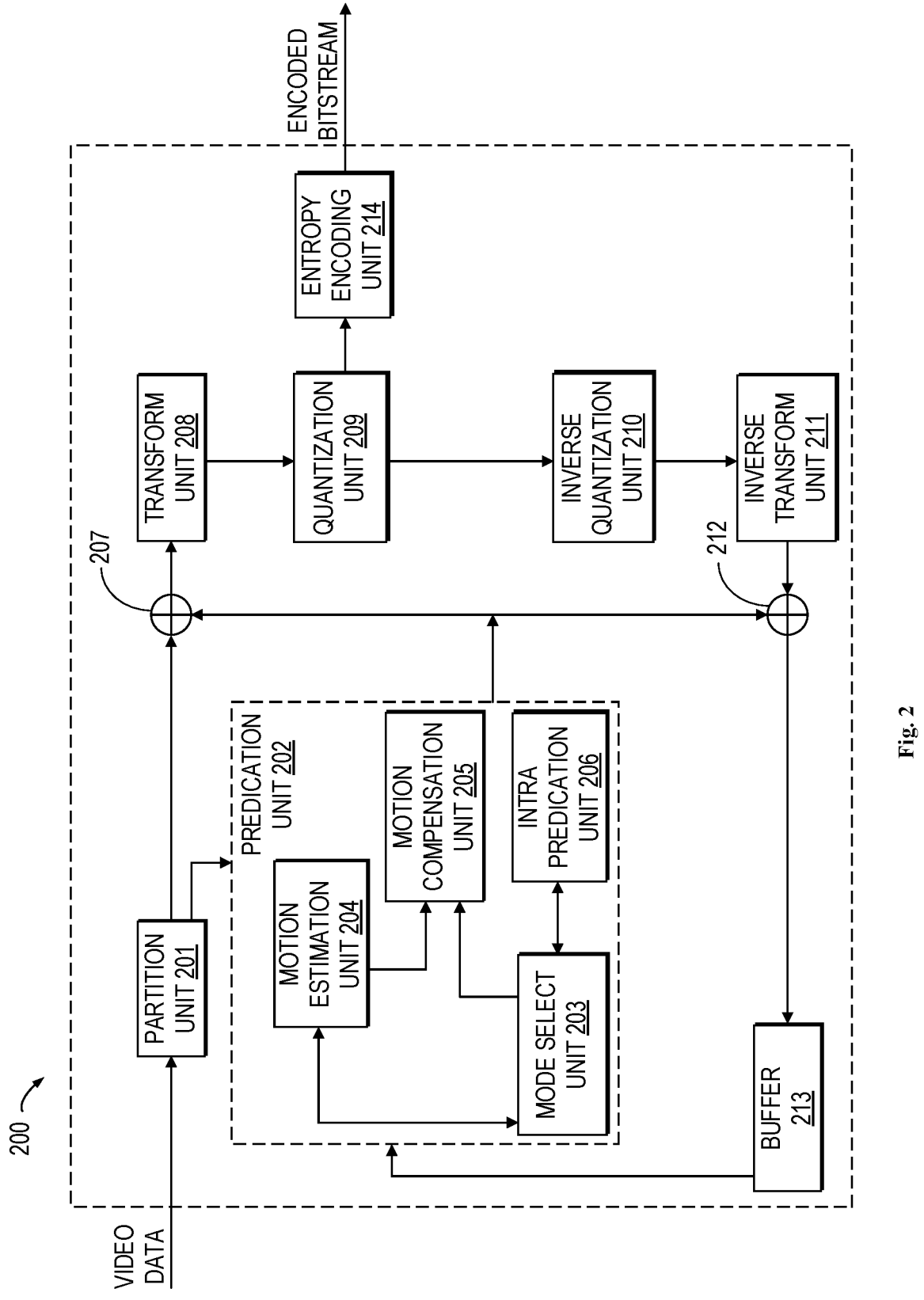
FIG. 2 illustrates a block diagram that illustrates a first example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
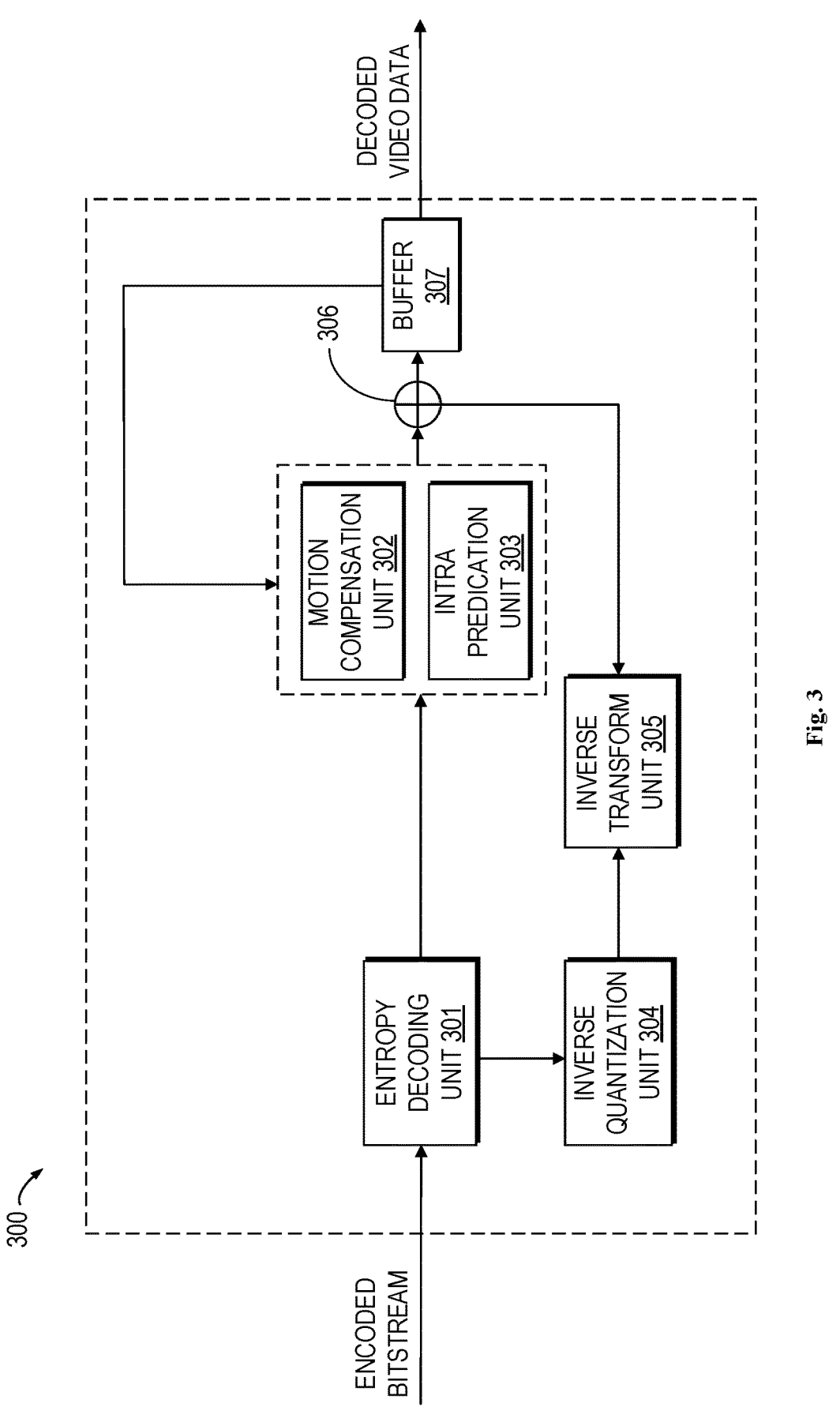
FIG. 3 illustrates a block diagram that illustrates an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding and video file format. Specifically, it is related to signalling of video decoder initialization information in a media file based on an entity grouping mechanism. The ideas may be applied individually or in various combinations, for video bitstreams coded by any codec, e.g., the VVC standard, and for any video file format, e.g., the ISO base media file format (ISOBMFF).

2. BACKGROUND

2.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard that has recently been developed by MPEG.

2.2. Decoding Capability Information (DCI) in VVC

The decoding capability information (DCI) NAL unit contains bitstream-level profile, tier, and level (PTL) information. The DCI NAL unit includes one or more PTL syntax structures that can be used during session negotiation between sender and receiver of a VVC bitstream. When the DCI NAL unit is present in a VVC bitstream, each output layer set (OLS) in the CVSs of the bitstream shall conform to the PTL information carried in least one of the PTL structures in the DCI NAL unit.

In AVC and HEVC, the PTL information for session negotiation is available in the SPS (for HEVC and AVC) and in the VPS (for HEVC layered extension). This design of conveying the PTL information for session negotiation in HEVC and AVC has disadvantages because the scope of SPS and VPS is within a CVS, instead of the whole bitstream. Because of that, sender-receiver session initiation may suffer from re-initiation during bitstream streaming at every new CVS. DCI solves this problem since it carries bitstream-level information, thus, the compliance to the indicated decoding capability can be guaranteed until the end of the bitstream.

2.3. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format, the HEVC file format, and the VVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format, the HEVC image file format, and the VVC image file format, would be needed.

2.4. Exiting Designs for Signalling of Video Decoder Initialization Information in a Video File MPEG input document m56019 proposes signalling of some video decoding initialization information (DII) in the ISOBMFF, as provided below.

2.4.1. The File Format Signalling

8.3.4.X Video Decoder Initialization Information Track Group

8.3.4.X.1 Definition

TrackGroupTypeBox with track_group_type equal to 'vdii' indicates that this track belongs to a group of video tracks that use the same profile of the same video codec and share the same video decoder initialization information.

NOTE 1 When the video decoder is initialized according to the video decoder initialization information, it is expected that no video decoder reinitialization is needed when bitstream switching occurs between any two of the bitstreams carried in this group of tracks.

NOTE 2 The video codec used for a chunk of a video track is indicated by the sample entry type.

8.3.4.X.2 Syntax

```
aligned(8) class VdiiGroupBox extends TrackGroupTypeBox ('vdii')
{
    unsigned int (8) dii_profile_max_tier_idc;
    unsigned int (8) dii_max_level_idc;
    unsigned int (2) dii_max_chroma_format_idc;
    unsigned int (4) dii_max_bitdepth_minus8;
    bit (2) reserved;
    unsigned int (8) dii_max_num_dec_pics_in_dpb_minus1;
    unsigned int (16) dii_max_pic_width;
    unsigned int (16) dii_max_pic_height;
}
```

8.3.4.X.1 Semantics dii_profile_max_tier_idc indicates the profile and, when applicable (e.g., HEVC and VVC), the maximum tier to which the video bitstreams carried in the group of tracks conform. When the video codec is AVC, dii_profile_max_tier_idc shall be equal to the profile_idc. When the video codec is HEVC or VVC, the first 7 bits of dii_profile_max_tier_idc shall be equal to general_profile_idc, and the last bit of dii_profile_max_tier_idc shall be equal to the greatest value of general_tier_flag for all the video bitstreams carried in the group of tracks.

dii_max_level_idc indicates the maximum level to which the video bitstreams carried in the group of tracks conform.

dii_max_chroma_format_idc indicates the maximum value of sps_chroma_format_idc (when the video codec is VVC) or chroma_format_idc (when the video codec is AVC or HEVC) of the SPS referenced by a picture when decoding the bitstreams carried in the group of tracks.

dii_max_bitdepth_minus8 plus 8 indicates the maximum bit depth, in units of bits, of each colour component of a decoded picture when decoding the bitstreams carried in the group of tracks. The value of dii_max_bitdepth_minus8 shall be in the range of 0 to 8, inclusive.

dii_max_num_dec_pics_in_dpb_minus1 plus 1 indicates the maximum number of decoded pictures stored in the decoded picture buffer at any moment when decoding the bitstreams carried in the group of tracks.

dii_max_pic_width indicates the maximum width, in units of luma samples, of a decoded picture when decoding the bitstreams carried in the group of tracks.

dii_max_pic_height indicates the maximum height, in units of luma samples, of a decoded picture when decoding the bitstreams carried in the group of tracks.

3. Problems

The existing design for signalling of video decoder initialization information (DII) in a media file uses a new type of track group. However, the container of the TrackGroupBox is the TrackBox, to figure out all the tracks that share the same DII would need to parse all the video tracks in the media file.

4. Detailed Solutions

To solve the above problem, methods as summarized below are disclosed. The embodiments should be considered as examples to explain the general concepts and should not be interpreted in a narrow way. Furthermore, these embodiments can be applied individually or combined in any manner. A new type of entity grouping is defined. The new type of entity grouping is named video decoder initialization information (VDII) entity grouping, with the grouping_type equal to 'vdii' (or a different name or a different grouping type value, but with similar features as described below).

1) In one example, it is specified that each entity in the entity group must be a video track.

2) A VdiiEntityGroupBox is defined, by extending the EntityToGroupBox, to carry at least one or more of the following pieces of information:

a. The video codec used to encode the bitstream(s);

b. The profile that the bitstream(s) conform to;

c. The maximum tier that all CVSs of the bitstream(s) conform to;

d. The maximum level that all CVSs of the bitstream(s) conform to, denoted by MaxLevel;

e. The maximum number of decoded pictures stored in the DPB when decoding the bitstream(s), denoted by MaxDecPics;

f. The maximum picture width of all coded pictures in the bitstream(s), in luma samples, denoted by MaxDecPicW;

g. The maximum picture height of all coded pictures in the bitstream(s), in luma samples, denoted by MaxDecPicH;

h. The maximum colour format (e.g., the greatest value of sps_chroma_format_idc) of all coded pictures in the bitstream(s), denoted by MaxColourFormat;

i. The maximum bit depth (e.g., the greatest value of sps_bitdepth_minus8) of all coded pictures in the bitstream(s), denoted by MaxBitdepth.

j. Let DpbMemory4MaxFormat denote the total amount of memory needed for storage of MaxDecPics decoded pictures with picture width equal to MaxDecPicW, picture height equal to MaxDecPicH, the colour format indicated by MaxColourFormat, and bit depth for each colour component equal to MaxBitdepth. An indication (e.g., by a flag) of whether DpbMemory4Max Format exceeds the maximum DPB size allowed for the level indicated by MaxLevel.

k. When it is indicated that DpbMemory4MaxFormat exceeds the maximum DPB size allowed for the level indicated by MaxLevel, an indication of the minimum level, denoted by MinLevel4MaxFormat, for which the allowed maximum DPB size is greater than or equal to DpbMemory4MaxFormat.

5. EMBODIMENTS

Below is an example embodiment for all of the aspects summarized above in Section 5 excluding item 2.a. The embodiment can be applied to ISOBMFF.

5.1. Video Decoder Initialization Information Entity Grouping Grouping

5.1.1. Definition

Tracks in the same entity group with grouping_type equal to 'vdii' are a group of video tracks that use the same profile of the same video codec and share the same video decoder initialization information.

NOTE 1 When the video decoder is initialized according to the video decoder initialization information, it is expected that no video decoder reinitialization is needed when bitstream switching occurs between any two of the bitstreams carried in this group of tracks.

NOTE 2 The video codec used for a chunk of a video track is indicated by the sample entry type.

All entities in a picture-in-picture entity group shall be video tracks.

5.1.2. Syntax

```
aligned(8)    class    VdiiEntityGroupBox    extends
EntityToGroupBox ('vdii', 0, 0) {
    unsigned int (8) dii_profile_max_tier_idc;
    unsigned int (8) dii_max_level_idc;
    unsigned int (8) dii_max_num_dec_pics_in_dpb_minus1;
    unsigned int (16) dii_max_pic_width;
    unsigned int (16) dii_max_pic_height;
    unsigned int (2) dii_max_chroma_format_idc;
    unsigned int (4) dii_max_bitdepth_minus8;
    unsigned int (1) dii_max_level_sufficient_flag
    bit (1) reserved;
    if (!dii_max_level_sufficient_flag)
        unsigned int (8) dii_min_level_needed_for_max_format
}
```

5.1.3. Semantics dii_profile_max_tier_idc indicates the profile and, when applicable (e.g., HEVC and VVC), the maximum tier to which the video bitstreams carried in the group of tracks conform. When the video codec is AVC, dii_profile_max_tier_idc shall be equal to the profile_idc. When the video codec is HEVC or VVC, the first 7 bits of dii_profile_max_tier_idc shall be equal to general_profile_idc, and the last bit of dii_profile_max_tier_idc shall be equal to the greatest value of general_tier_flag for all the video bitstreams carried in the group of tracks.

dii_max_level_idc indicates the maximum level to which the video bitstreams carried in the group of tracks conform.

dii_max_num_dec_pics_in_dpb_minus1 plus 1 indicates the maximum number of decoded pictures stored in the decoded picture buffer at any moment when decoding the bitstreams carried in the group of tracks.

dii_max_pic_width indicates the maximum width, in units of luma samples, of a decoded picture when decoding the bitstreams carried in the group of tracks.

dii_max_pic_height indicates the maximum height, in units of luma samples, of a decoded picture when decoding the bitstreams carried in the group of tracks.

dii_max_chroma_format_idc indicates the maximum value of sps_chroma_format_idc (when the video codec is VVC) or chroma_format_idc (when the video codec is AVC or HEVC) of the SPS referenced by a picture when decoding the bitstreams carried in the group of tracks.

dii_max_bitdepth_minus8 plus 8 indicates the maximum bit depth, in units of bits, of each colour component of a decoded picture when decoding the bitstreams carried in the group of tracks. The value of dii_max_bitdepth_minus8 shall be in the range of 0 to 8, inclusive.

dii_max_level_sufficient_flag equal to 1 indicates that both of the following conditions are true: 1) the value of dii_max_pic_width*dii_max_pic_height is less than or equal to the value of MaxLumaPs for the maximum level to which the CVSs in the bitstream conform; and 2) the value of dii_max_num_dec_pics_in_dpb_minus1+1 is less than or equal to the value of MaxDpbSize derived by Equation 1577 of the VVC specification, with PicSize MaxInSamples Y being set equal to dii_max_pic_width*dii_max_pic_height, and MaxLumaPs being the MaxLumaPs for the maximum level.

dii min level needed for max format indicates the minimum level, denoted by MinLevel4MaxFormat, for which both of the following conditions are true: 1) the value of dii_max_pic_width*dii_max_pic_height is less than or equal to the value of MaxLumaPs for the level MinLevel4MaxFormat; and 2) the value of dii_max_num_dec_pics_in_dpb_minus1+1 is less than or equal to the value of MaxDpbSize derived by Equation 1577 of the VVC specification, with PicSize Max InSamples Y being set equal to dii_max_pic_width*dii_max_pic_height, and MaxLumaPs being the MaxLumaPs for the level MinLevel4MaxFormat. The value of dii min level needed for max format for a particular level shall be equal to the value of general_level_idc for the particular level.

The embodiments of the present disclosure are related to signaling of VDII using entity grouping.

Figure 4:
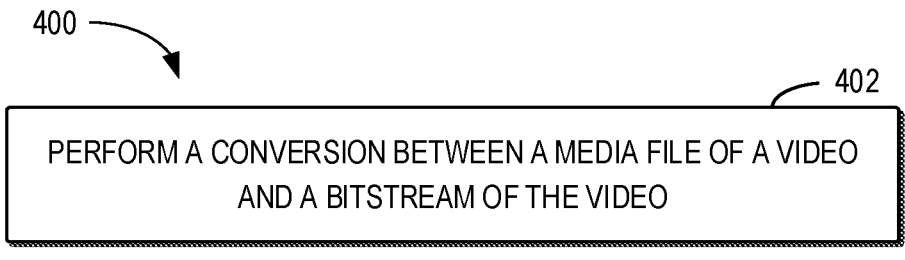
FIG. 4 illustrates a flowchart of a method for video processing in accordance with some embodiments of the present disclosure.

FIG. 4 illustrates a flowchart of a method 400 for video processing in accordance with some embodiments of the present disclosure. The method 400 may be implemented at a client or a server. The term "client" used herein may refer to a piece of computer hardware or software that accesses a service made available by a server as part of the client-server model of computer networks. By way of example, the client may be a smartphone or a tablet. The term "server" used herein may refer to a device capable of computing, in which case the client accesses the service by way of a network. The server may be a physical computing device or a virtual computing device.

As shown in FIG. 4, the method 400 starts at 402 where a conversion between a media file of a video and a bitstream of the video is performed. The media file comprises a data structure indicating video decoder initialization information (VDII) for decoding the bitstream. The data structure is at a level higher than a track level. By way of example, the data structure is an entity group. That is, a new type of entity group may be defined. The VDII may be indicated by this new type of entity group. It should be understood that the above examples are described merely for purpose of description. The scope of the present disclosure is not limited in this respect.

According to the method 400, the VDII is indicated by a data structure at a level higher than a track level. Compared with the conventional solution where the VDII is signaled based on a track group at the track level, the method 400 can advantageously make it possible to figure out all the tracks that share the same VDII without parsing all the video tracks in the media file. Thereby, the VDII can be signaled more efficiently.

In some embodiments, the data structure may be an entity group. A value of a type field of the entity group may be equal to "vdii". The type field indicates a type of the entity group. By way of example, the field grouping_type of the entity group may be equal to "vdii".

In some embodiments, each entity in the entity group may be a video track. That is, each entity in the entity group must be a video track.

In some embodiments, the data structure may comprise various information for video decoder initialization. For example, such information may comprise: an indication of a video codec for encoding the bitstream, an indication of a profile to which the bitstream conforms, an indication of the maximum tier to which all coded video sequences (CVS) of the bitstream conform, an indication of the maximum level to which all CVSs of the bitstream conform, an indication of the maximum number of decoded pictures stored in a decoded picture buffer (DPB) when the bitstream being decoded, an indication of the maximum picture width of all coded pictures in the bitstream, an indication of the maximum picture height of all coded pictures in the bitstream, an indication of the maximum color format of all coded pictures in the bitstream, an indication of the maximum bit depth of all coded pictures in the bitstream, an indication indicating whether a first memory exceeds the maximum DPB size allowed for the maximum level, the first memory being equal to a total amount of memory for storing a set of decoded pictures, an indication of the minimum level for which the maximum DPB size allowed for the maximum level is greater than or equal to the first memory, or the like. It should be understood that the above illustrations are described merely for purpose of description. The scope of the present disclosure is not limited in this respect.

In some embodiments, the number of decoded pictures in the set of decoded pictures may be equal to the maximum number, a width of each of the set of decoded pictures may be equal to the maximum picture width, a height of each of the set of decoded pictures may be equal to the maximum picture height, a color format of each of the set of decoded pictures may be the maximum color format, and a bit depth of each of the set of decoded pictures may be equal to the maximum bit depth.

In some embodiments, the conversion may comprise generating the media file and storing the bitstream to the media file. In some additional or alternative embodiments, the conversion may comprise parsing the media file to reconstruct the bitstream.

In some embodiments, a bitstream of a video may be stored in a non-transitory computer-readable recording medium. The bitstream of the video can be generated by a method performed by a video processing apparatus. According to the method, a conversion between a media file of the video and the bitstream is performed. The media file comprises a data structure indicating VDII for decoding the bitstream, the data structure being at a level higher than a track level.

In some embodiments, a conversion between a media file of the video and the bitstream is performed. The media file comprises a data structure indicating VDII for decoding the bitstream, the data structure being at a level higher than a track level. The bitstream may be stored in a non-transitory computer-readable recording medium.

In some embodiments, a media file of a video may be stored in a non-transitory computer-readable recording medium. The media file of the video can be generated by a method performed by a video processing apparatus. According to the method, a conversion between a media file of the video and the bitstream is performed. The media file comprises a data structure indicating VDII for decoding the bitstream, the data structure being at a level higher than a track level.

In some embodiments, a conversion between a media file of the video and the bitstream is performed. The media file comprises a data structure indicating VDII for decoding the bitstream, the data structure being at a level higher than a track level. The media file may be stored in a non-transitory computer-readable recording medium.

Implementations of the present disclosure can be described in view of the following clauses, the features of which can be combined in any reasonable manner.

Clause 1. A method for video processing, comprising: performing a conversion between a media file of a video and a bitstream of the video, wherein the media file comprises a data structure indicating video decoder initialization information (VDII) for decoding the bitstream, the data structure being at a level higher than a track level.

Clause 2. The method of clause 1, wherein the data structure is an entity group.

Clause 3. The method of clause 2, wherein a value of a type field of the entity group is equal to "vdii", the type field indicates a type of the entity group.

Clause 4. The method of any of clauses 2-3, wherein each entity in the entity group is a video track.

Clause 5. The method of any of clauses 1-4, wherein the data structure comprises at least one of: an indication of a video codec for encoding the bitstream, an indication of a profile to which the bitstream conforms, an indication of the maximum tier to which all coded video sequences (CVS) of the bitstream conform, an indication of the maximum level to which all CVSs of the bitstream conform, an indication of the maximum number of decoded pictures stored in a decoded picture buffer (DPB) when the bitstream being decoded, an indication of the maximum picture width of all coded pictures in the bitstream, an indication of the maximum picture height of all coded pictures in the bitstream, an indication of the maximum color format of all coded pictures in the bitstream, an indication of the maximum bit depth of all coded pictures in the bitstream, an indication indicating whether a first memory exceeds the maximum DPB size allowed for the maximum level, the first memory being equal to a total amount of memory for storing a set of decoded pictures, or an indication of the minimum level for which the maximum DPB size allowed for the maximum level is greater than or equal to the first memory.

Clause 6. The method of clause 5, wherein the number of decoded pictures in the set of decoded pictures is equal to the maximum number, a width of each of the set of decoded pictures is equal to the maximum picture width, a height of each of the set of decoded pictures is equal to the maximum picture height, a color format of each of the set of decoded pictures is the maximum color format, and a bit depth of each of the set of decoded pictures is equal to the maximum bit depth.

Clause 7. The method of any of clauses 1-6, wherein the conversion comprises generating the media file and storing the bitstream to the media file.

Clause 8. The method of any of clauses 1-6, wherein the conversion comprises parsing the media file to reconstruct the bitstream.

Clause 9. An apparatus for processing video data comprising a processor and a non-transitory memory with instructions thereon, wherein the instructions upon execution by the processor, cause the processor to perform a method in accordance with any of Clauses 1-8.

Clause 10. A non-transitory computer-readable storage medium storing instructions that cause a processor to perform a method in accordance with any of Clauses 1-8.

Clause 11. A non-transitory computer-readable recording medium storing a bitstream of a video which is generated by a method performed by a video processing apparatus, wherein the method comprises: performing a conversion between a media file of the video and the bitstream, wherein the media file comprises a data structure indicating video decoder initialization information (VDII) for decoding the bitstream, the data structure being at a level higher than a track level.

Clause 12. A method for storing a bitstream of a video, comprising: performing a conversion between a media file of the video and the bitstream; and storing the bitstream in a non-transitory computer-readable recording medium, wherein the media file comprises a data structure indicating video decoder initialization information (VDII) for decoding the bitstream, the data structure being at a level higher than a track level.

Clause 13. A non-transitory computer-readable recording medium storing a media file of a video which is generated by a method performed by a video processing apparatus, wherein the method comprises: performing a conversion between the media file and a bitstream of the video, wherein the media file comprises a data structure indicating video decoder initialization information (VDII) for decoding the bitstream, the data structure being at a level higher than a track level.

Clause 14. A method for storing a media file of a video, comprising: performing a conversion between the media file and a bitstream of the video; and storing the media file in a non-transitory computer-readable recording medium, wherein the media file comprises a data structure indicating video decoder initialization information (VDII) for decoding the bitstream, the data structure being at a level higher than a track level.

Example Device

Figure 5:
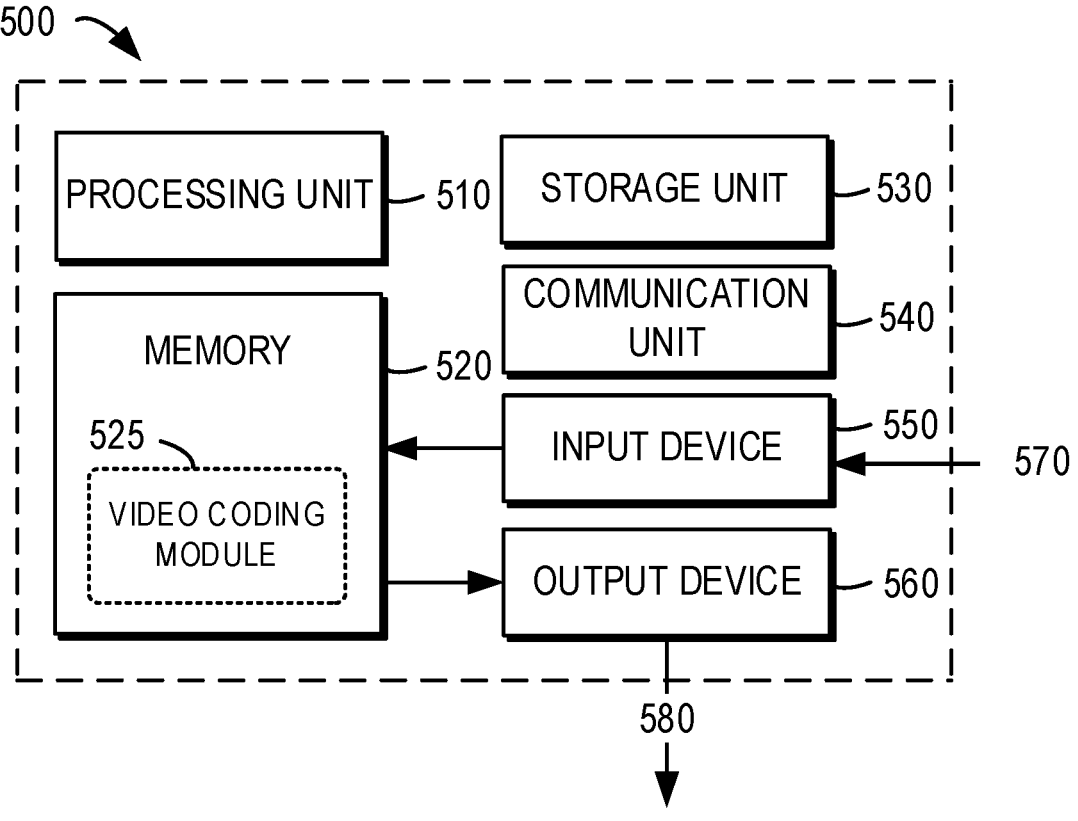
FIG. 5 illustrates a block diagram of a computing device in which various embodiments of the present disclosure can be implemented.

FIG. 5 illustrates a block diagram of a computing device 500 in which various embodiments of the present disclosure can be implemented. The computing device 500 may be implemented as or included in the source device 110 (or the video encoder 114 or 200) or the destination device 120 (or the video decoder 124 or 300).

It would be appreciated that the computing device 500 shown in FIG. 5 is merely for purpose of illustration, without suggesting any limitation to the functions and scopes of the embodiments of the present disclosure in any manner.

As shown in FIG. 5, the computing device 500 includes a general-purpose computing device 500. The computing device 500 may at least comprise one or more processors or processing units 510, a memory 520, a storage unit 530, one or more communication units 540, one or more input devices 550, and one or more output devices 560.

In some embodiments, the computing device 500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 500 can support any type of interface to a user (such as "wearable" circuitry and the like).

The processing unit 510 may be a physical or virtual processor and can implement various processes based on programs stored in the memory 520. In a multi-processor system, multiple processing units execute computer executable instructions in parallel so as to improve the parallel processing capability of the computing device 500. The processing unit 510 may also be referred to as a central processing unit (CPU), a microprocessor, a controller or a microcontroller.

The computing device 500 typically includes various computer storage medium. Such medium can be any medium accessible by the computing device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk or another other media, which can be used for storing information and/or data and can be accessed in the computing device 500.

The computing device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further computing device via the communication medium. In addition, the functions of the components in the computing device 500 can be implemented by a single computing cluster or multiple computing machines that can communicate via communication connections. Therefore, the computing device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the computing device 500 can further communicate with one or more external devices (not shown) such as the storage devices and display device, with one or more devices enabling the user to interact with the computing device 500, or any devices (such as a network card, a modem and the like) enabling the computing device 500 to communicate with one or more other computing devices, if required. Such communication can be performed via input/output (I/O) interfaces (not shown).

In some embodiments, instead of being integrated in a single device, some or all components of the computing device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 500 may be used to implement video encoding/decoding in embodiments of the present disclosure. The memory 520 may include one or more video coding modules 525 having one or more program instructions. These modules are accessible and executable by the processing unit 510 to perform the functionalities of the various embodiments described herein.

In the example embodiments of performing video encoding, the input device 550 may receive video data as an input 570 to be encoded. The video data may be processed, for example, by the video coding module 525, to generate an encoded bitstream. The encoded bitstream may be provided via the output device 560 as an output 580.

In the example embodiments of performing video decoding, the input device 550 may receive an encoded bitstream as the input 570. The encoded bitstream may be processed, for example, by the video coding module 525, to generate decoded video data. The decoded video data may be provided via the output device 560 as the output 580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A method for video processing, comprising:

performing a conversion between a media file of a video and a bitstream of the video, wherein the media file comprises a data structure indicating video decoder initialization information (VDII) for decoding the bitstream, the data structure being at a level higher than a track level.

2. The method of claim 1, wherein the data structure is an entity group.

3. The method of claim 2, wherein a value of a type field of the entity group is equal to "vdii", the type field indicates a type of the entity group.

4. The method of claim 2, wherein each entity in the entity group is a video track.

5. The method of claim 1, wherein the data structure comprises at least one of:

an indication of a video codec for encoding the bitstream, an indication of a profile to which the bitstream conforms, an indication of the maximum tier to which all coded video sequences (CVS) of the bitstream conform, an indication of the maximum level to which all CVSs of the bitstream conform, an indication of the maximum number of decoded pictures stored in a decoded picture buffer (DPB) when the bitstream being decoded, an indication of the maximum picture width of all coded pictures in the bitstream, an indication of the maximum picture height of all coded pictures in the bitstream, an indication of the maximum color format of all coded pictures in the bitstream, an indication of the maximum bit depth of all coded pictures in the bitstream, an indication indicating whether a first memory exceeds the maximum DPB size allowed for the maximum level, the first memory being equal to a total amount of memory for storing a set of decoded pictures, or an indication of the minimum level for which the maximum DPB size allowed is greater than or equal to the first memory.

6. The method of claim 5, wherein the number of decoded pictures in the set of decoded pictures is equal to the maximum number, a width of each of the set of decoded pictures is equal to the maximum picture width, a height of each of the set of decoded pictures is equal to the maximum picture height, a color format of each of the set of decoded pictures is the maximum color format, and a bit depth of each of the set of decoded pictures is equal to the maximum bit depth.

7. The method of claim 1, wherein the conversion comprises generating the media file and storing the bitstream to the media file.

8. The method of claim 1, wherein the conversion comprises parsing the media file to reconstruct the bitstream.

9. An apparatus for processing video data comprising a processor and a non-transitory memory with instructions thereon, wherein the instructions upon execution by the processor, cause the processor to perform acts comprising:

performing a conversion between a media file of a video and a bitstream of the video, wherein the media file comprises a data structure indicating video decoder initialization information (VDII) for decoding the bitstream, the data structure being at a level higher than a track level.

10. The apparatus of claim 9, wherein the data structure is an entity group.

11. The apparatus of claim 10, wherein a value of a type field of the entity group is equal to "vdii", the type field indicates a type of the entity group, or wherein each entity in the entity group is a video track.

12. The apparatus of claim 9, wherein the data structure comprises at least one of:

an indication of a video codec for encoding the bitstream, an indication of a profile to which the bitstream conforms, an indication of the maximum tier to which all coded video sequences (CVS) of the bitstream conform, an indication of the maximum level to which all CVSs of the bitstream conform, an indication of the maximum number of decoded pictures stored in a decoded picture buffer (DPB) when the bitstream being decoded, an indication of the maximum picture width of all coded pictures in the bitstream, an indication of the maximum picture height of all coded pictures in the bitstream, an indication of the maximum color format of all coded pictures in the bitstream, an indication of the maximum bit depth of all coded pictures in the bitstream, an indication indicating whether a first memory exceeds the maximum DPB size allowed for the maximum level, the first memory being equal to a total amount of memory for storing a set of decoded pictures, or an indication of the minimum level for which the maximum DPB size allowed is greater than or equal to the first memory.

13. The apparatus of claim 12, wherein the number of decoded pictures in the set of decoded pictures is equal to the maximum number, a width of each of the set of decoded pictures is equal to the maximum picture width, a height of each of the set of decoded pictures is equal to the maximum picture height, a color format of each of the set of decoded pictures is the maximum color format, and a bit depth of each of the set of decoded pictures is equal to the maximum bit depth.

14. A non-transitory computer-readable storage medium storing instructions that cause a processor to perform acts comprising:

performing a conversion between a media file of a video and a bitstream of the video, wherein the media file comprises a data structure indicating video decoder initialization information (VDII) for decoding the bitstream, the data structure being at a level higher than a track level.

15. The non-transitory computer-readable storage medium of claim 14, wherein the data structure is an entity group.

16. The non-transitory computer-readable storage medium of claim 15, wherein a value of a type field of the entity group is equal to "vdii", the type field indicates a type of the entity group, or wherein each entity in the entity group is a video track.

17. The non-transitory computer-readable storage medium of claim 14, wherein the data structure comprises at least one of:

an indication of a video codec for encoding the bitstream, an indication of a profile to which the bitstream conforms, an indication of the maximum tier to which all coded video sequences (CVS) of the bitstream conform, an indication of the maximum level to which all CVSs of the bitstream conform, an indication of the maximum number of decoded pictures stored in a decoded picture buffer (DPB) when the bitstream being decoded, an indication of the maximum picture width of all coded pictures in the bitstream, an indication of the maximum picture height of all coded pictures in the bitstream, an indication of the maximum color format of all coded pictures in the bitstream, an indication of the maximum bit depth of all coded pictures in the bitstream, an indication indicating whether a first memory exceeds the maximum DPB size allowed for the maximum level, the first memory being equal to a total amount of memory for storing a set of decoded pictures, or an indication of the minimum level for which the maximum DPB size allowed is greater than or equal to the first memory.

18. The non-transitory computer-readable storage medium of claim 17, wherein the number of decoded pictures in the set of decoded pictures is equal to the maximum number, a width of each of the set of decoded pictures is equal to the maximum picture width, a height of each of the set of decoded pictures is equal to the maximum picture height, a color format of each of the set of decoded pictures is the maximum color format, and a bit depth of each of the set of decoded pictures is equal to the maximum bit depth.

19. A non-transitory computer-readable recording medium storing a media file of a video which is generated by a method performed by a video processing apparatus, wherein the method comprises:

performing a conversion between the media file and a bitstream of the video, wherein the media file comprises a data structure indicating video decoder initialization information (VDII) for decoding the bitstream, the data structure being at a level higher than a track level.

20. The non-transitory computer-readable storage medium of claim 19, wherein the data structure is an entity group.

* * * * *